UNITED STATES PATENT OFFICE.

FRANCIS I. du PONT, OF WILMINGTON, DELAWARE.

GRAVITY LIQUID SEPARATION OF CERTAIN IRON ORES.

1,002,865.

Specification of Letters Patent. Patented Sept. 12, 1911.

No Drawing. Application filed June 17, 1910, Serial No. 567,406. Renewed February 14, 1911. Serial No. 608,599.

*To all whom it may concern:*

Be it known that I, FRANCIS I. DU PONT, a citizen of the United States, residing at Wilmington, county of Newcastle, and State of Delaware, have invented a new and useful Improvement in Gravity Liquid Separation of Certain Iron Ores, of which the following is a full, clear, and exact description.

My invention has for its object the separation by gravity liquid separation in limonite, hydrate of iron, of the metal constituents from the quartz or silicious material.

The object of my invention is to separate the constituents of such ores so that the resultant iron constituent shall not contain silica in excess of that which is characteristic of a first class iron ore.

My process, generally speaking, consists of the following. The limonite, hydrate of iron, is heated. The heat drives off the combined water, leaving as the resultant esquioxid of iron $Fe_2O_3$, which is of greater specific gravity than the limonite or original ore. On the other hand, the carried silica is not changed in specific gravity by the heating. The material is then subjected to separation in a tank containing as the separating liquid antimony bromid maintained substantially at an even temperature of 100° C.

The method of my invention is carried out in the following manner: The ore, preferably finely divided, is subjected to heat, producing the result described. This material is then fed into the separating tank containing the separating liquid, antimony bromid. By gravity a separation of the good ore from the silicious and waste material takes place. The different specific gravities between the two constituents cause them to occupy different layers in the separating liquid, enabling the two constituents to be separately removed from the separating liquid. As stated before, the iron resultant of this separation will contain only an amount of silica which is characteristic of a good ore and which does not harmfully affect its value.

So far as the heating is concerned, it may be carried out in any furnace.

So far as the separation is concerned, any form of separating tank suitably surrounded or having provided a heating medium may be used.

Having now fully described my invention, what I claim and desire to protect by Letters Patent is:—

1. The hereinbefore described method for concentrating those iron ores which are adapted to be changed in composition by heat, which consists in heating said ores, then subjecting said ores to a separating action in antimony bromid maintained as a liquid.

2. The hereinbefore described method for concentrating those iron ores which are adapted to be changed in composition by heat, which consists in heating said ores then subjecting said ores to a separating action in antimony bromid maintained as a liquid and at a substantially constant temperature.

In testimony of which invention, I have hereunto set my hand, at Philadelphia, on this 15th day of June, 1910.

FRANCIS I. DU PONT.

Witnesses:
M. M. HAMILTON,
A. M. URIAN.